(12) United States Patent
Becker et al.

(10) Patent No.: US 9,322,400 B2
(45) Date of Patent: Apr. 26, 2016

(54) JET PUMP WITH CENTRALIZED NOZZLE

(71) Applicant: FORD GLOBAL TECHNOLOGIES, LLC, Dearborn, MI (US)

(72) Inventors: Lee J. Becker, Canton, MI (US); Charles M. Robeck, Farmington Hills, MI (US); Mark R. Dobson, Howell, MI (US); Li Liu, Canton, MI (US); Jason R. Ludwig, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 806 days.

(21) Appl. No.: 13/633,235

(22) Filed: Oct. 2, 2012

(65) Prior Publication Data

US 2014/0093401 A1    Apr. 3, 2014

(51) Int. Cl.
| | |
|---|---|
| F04B 23/08 | (2006.01) |
| F04B 23/14 | (2006.01) |
| F04F 5/10 | (2006.01) |
| F04F 5/46 | (2006.01) |
| F04F 5/54 | (2006.01) |
| F16H 57/04 | (2010.01) |

(52) U.S. Cl.
CPC ............... *F04B 23/08* (2013.01); *F04B 23/14* (2013.01); *F04F 5/10* (2013.01); *F04F 5/46* (2013.01); *F04F 5/54* (2013.01); *F16H 57/0438* (2013.01)

(58) Field of Classification Search
CPC .............. F04F 5/02; F04F 5/10; F04F 5/44; F04F 5/46; F04F 5/54; F04B 23/04; F04B 23/12; F04B 23/08; F04B 23/14; F16H 57/0438

USPC ............... 417/76, 79, 159, 175, 198
See application file for complete search history.

(56) References Cited

U.S. PATENT DOCUMENTS

| | | | | |
|---|---|---|---|---|
| RE21,416 | E * | 4/1940 | Sargent | 417/159 |
| 2,310,265 | A * | 2/1943 | Sweeny | B01F 5/0426 |
| | | | | 406/194 |
| 2,820,418 | A * | 1/1958 | Sullivan et al. | 417/198 |
| 3,280,748 | A * | 10/1966 | Ogles | F04D 9/06 |
| | | | | 415/132 |
| 3,688,511 | A * | 9/1972 | Harmstrof et al. | 405/159 |
| 4,033,706 | A * | 7/1977 | Schaefer et al. | 417/79 |
| 4,487,553 | A * | 12/1984 | Nagata | 417/171 |
| 5,868,550 | A * | 2/1999 | Howchin | F04D 9/006 |
| | | | | 415/1 |
| 5,878,632 | A | 3/1999 | Hubler et al. | |
| 5,893,641 | A * | 4/1999 | Garcia | 366/163.2 |
| 5,992,763 | A | 11/1999 | Smith et al. | |
| 6,623,154 | B1 * | 9/2003 | Garcia | 366/163.2 |
| 6,666,655 | B2 * | 12/2003 | Heath et al. | 417/87 |
| 7,192,257 | B2 | 3/2007 | Becker et al. | |
| 2010/0111718 | A1 * | 5/2010 | Schultz | F16H 57/0402 |
| | | | | 417/313 |
| 2010/0290924 | A1 * | 11/2010 | Becker et al. | 417/79 |

* cited by examiner

*Primary Examiner* — Peter J Bertheaud
*Assistant Examiner* — Joseph Herrmann
(74) *Attorney, Agent, or Firm* — James Dottavio; MacMillan, Sobanski & Todd, LLC

(57) ABSTRACT

A jet pump that supplies fluid to a transmission pump includes a pump inlet, a sump, a fluid source, and a nozzle including an axial passage for carrying fluid from the sump toward the inlet, and a second passage having an arcuate periphery and including an entrance facing a lateral side of the nozzle and connected to the fluid source and an exit communicating with the pump inlet.

2 Claims, 2 Drawing Sheets

JET PUMP WITH CENTRALIZED NOZZLE

BACKGROUND OF THE INVENTION

1. Field of the Invention

This invention relates generally to a nozzle, which directs a fluid stream to function as a jet pump for boosting automatic transmission oil pump inlet pressure using excess flow recirculation.

2. Description of the Prior Art

Many automatic transmissions include fixed-displacement oil pumps, which delivers a fixed volume of fluid for each cycle of the pump. However, the delivery of this volume is contingent upon the pumping chambers filling completely with oil during the intake portion of the pump's cycle. Typically, some speed is reached at which the pressure head in the inlet port is insufficient to force fluid into the pumping chambers at the rate at which the chamber volume is expanding. At this speed (known as the High Speed Fill Limit) the vapor pressure of the fluid is reached and the fluid begins to cavitate inside the pumping chamber. The level of cavitation increases with increasing speed.

This cavitation has several effects. It reduces the pump volumetric flow rate below its theoretical value. Generally, this decrease in flow rate relative to the theoretical value does not pose significant problems for the transmission from a flow availability standpoint, since fixed-displacement pumps are generally sized to provide sufficient flow at lower speeds and thus produce excess flow at high speeds.

Pump cavitation also causes noise. Continual increases in customer expectations for vehicle refinement mean that pump noise has become an area of significant interest in powertrain NVH, so cavitation noise can negatively impact customer satisfaction and result in a poor perception of vehicle quality.

High levels of cavitation can produce significant hardware damage if left unchecked, which is, of course, unacceptable.

SUMMARY OF THE INVENTION

A jet pump that supplies fluid to a transmission pump includes a pump inlet, a sump, a fluid source, and a nozzle including an axial passage for carrying fluid from the sump toward the inlet, and a second passage having an arcuate periphery and including an entrance facing a lateral side of the nozzle and connected to the fluid source and an exit communicating with the pump inlet.

The nozzle is a separate part from the pump body and the nozzle feature is controlled only by the geometry of a single part, such that the recirculation flow path is perpendicular to the suction flow path, so the nozzle not only accelerates the flow, but also redirects it to be in line with the suction path.

The nozzle produces a greater ratio of inlet pressure boost to back pressure.

The nozzle is also robust to assembly variation, since the nozzle exit area is not controlled by the dimensional tolerance stack-up between the nozzle piece and the pump body.

The nozzle back pressure is less sensitive to oil temperature, because the nozzle flow path lacks the slot-like shape of an annular jet, which produces large back pressures at high viscosities.

In other designs, a nozzle shape is cast into the pump body or an orifice acts as the nozzle, but the resulting efficiency is not optimal because the flow leaving the nozzle enters the low velocity flow at an angle from the side, impinging on some of the low velocity flow.

If a nozzle isn't employed, exit losses result in poor jet pump efficiency.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
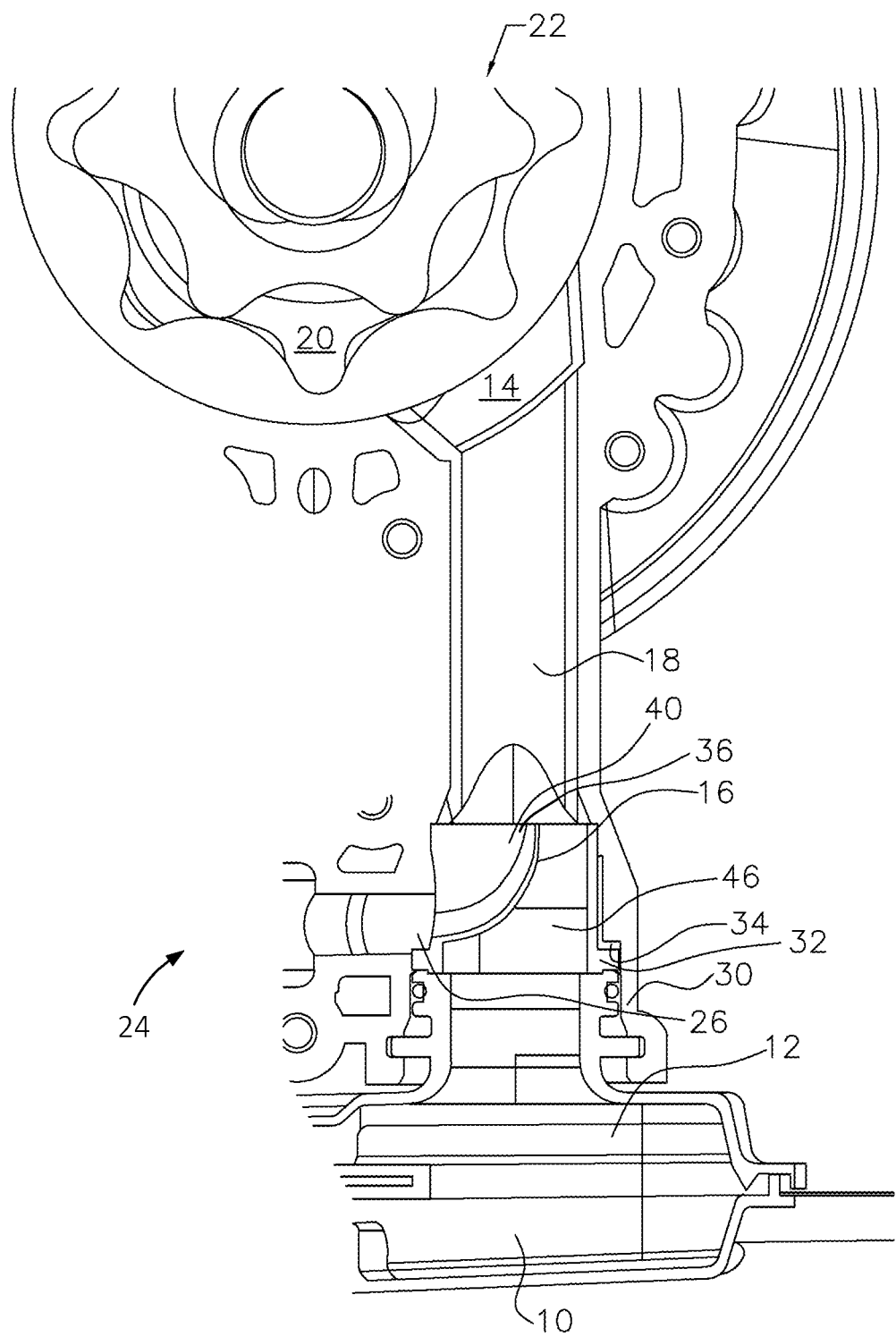
FIG. 1 is a cross sectional side view showing a transmission pump, oil sump, suction flow passage and recirculation nozzle.
Figure 2:
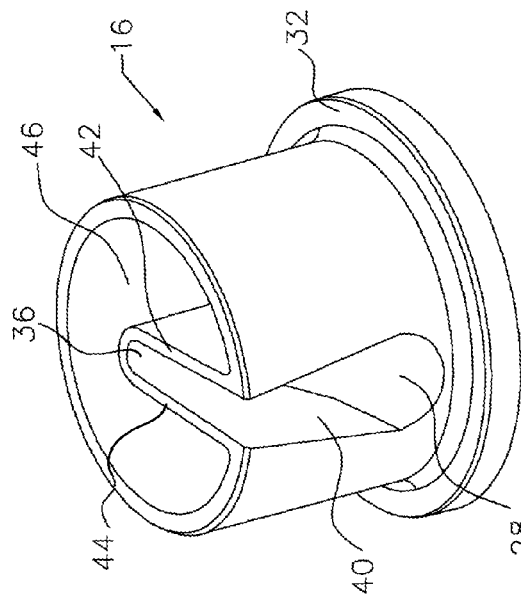
FIG. 2 is perspective view of the recirculation nozzle of FIG. 1.

In most automatic transmissions, hydraulic fluid, such as automatic transmission fluid (ATF), located in a transmission sump 10 is at atmospheric pressure and is drawn into a pump inlet 14 of a transmission pump 22 via a transmission pump and jet pump assembly 24. This fluid is drawn through a filter 12, with some associated pressure drop, and then up into the pump inlet 14. Therefore, absent any other intervention, fluid pressure in the pump inlet port 14 will be less than atmospheric pressure.

In a transmission with a jet pump feature, any pump flow not needed by the transmission is recirculated through a jet pump nozzle 16 and merged with the flow exiting the filter 12. This merged flow of a jet pump reduces flow across the filter 12, and therefore reduces the associated pressure drop. A primary effect of the jet pump is to impart some of the energy of the recirculation flow thorough the nozzle 16 to the suction flow in passage 18 as the two flows merge.

As this merged flow enters the pump inlet passages, its velocity decreases due to the increasing flow area and its static pressure therefore increases. A well-designed jet system can increase the pump inlet pressure above atmospheric pressure, and reduce, or even eliminate, the presence of cavitation within the pumping chambers 20 of the transmission's pump 22.

In an annular jet pump, the high speed flow emerges from an annular gap between two parts and encircles the lower speed suction flow in passage 18.

Preferably flow from a jet pump nozzle 16 emerges near the center of the suction flow inlet passage 18. The primary means of achieving this is nozzle 16, in which the recirculation flow in passage 26 is both turned upward toward the inlet 14 of pump 22 and accelerated by an arcuate, scoop-shaped passage 40 having an entrance 28 at the lateral side of the nozzle 16 and an exit 36 at or near the center of the suction flow passage 18.

Figure 3:
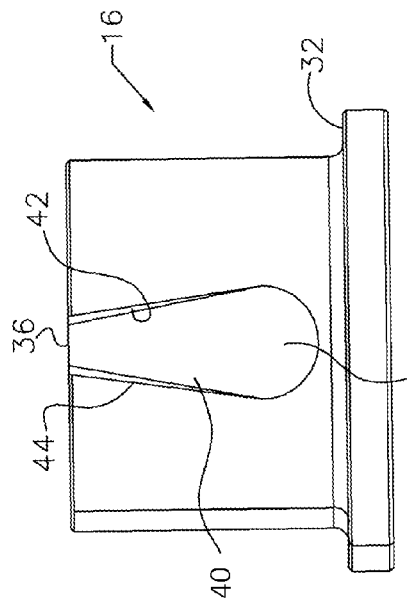
FIG. 3 is a side view of the recirculation nozzle of FIG. 1.
Figure 4:
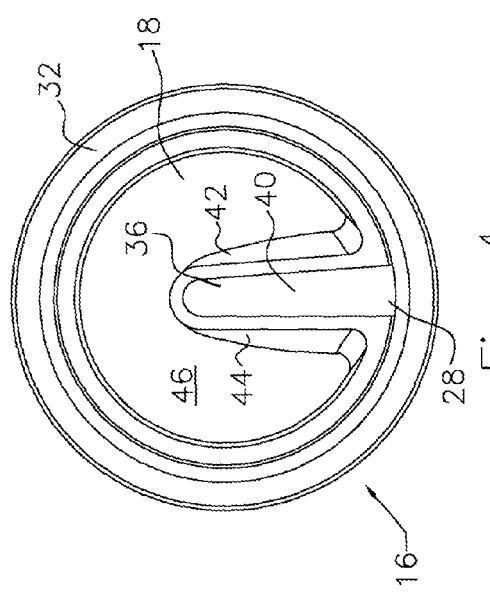
FIG. 4 is atop view of the recirculation nozzle of FIG. 1.
Figure 5:
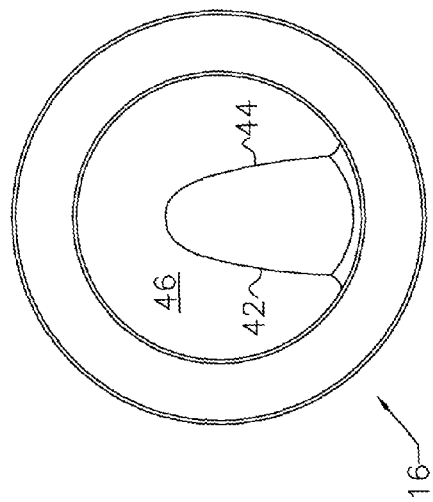
FIG. 5 is a bottom view of the recirculation nozzle.

The flow area of nozzle 16 is not produced by a gap between two parts, such as a nozzle and a housing, but by the single-piece nozzle 16. As seen best in FIGS. 3 and 4, the cross sectional area of the flow passage 40 in nozzle 16 decreases continually along the length of the passage from its entrance 28 to its exit 36 due to the side walls 42, 44 of passage 40 sloping inward and upward from entrance 28 to exit 36. The side walls 42, 44 of passage 40 separate jet passage 40 from axial passage 46, through which flow from sump 10 is carried to the suction flow passage 18 in pump body 30 and to the pump inlet 14.

An outer peripheral surface of passage 40 is arcuate, as seen best in FIG. 1, such that the recirculation flow path is perpendicular to the suction flow path in passages 18 and 46. Passage 46 is in the form of a right circular cylinder. Nozzle 16 not only accelerates the flow from passage 26 but also redirects it in-line with the suction path in passages 18 and 46.

Preferably the nozzle 16 is a one-piece casting, in which a slide is used to produce the nozzle.

Nozzle 16 is pressed into the pump body 30, such that a flange 32 at the base of the nozzle contacts a stop 34 on the pump body 30, thereby establishing the elevation of the nozzle exit 36 relative to the pump inlet 14. The angular disposition of nozzle 16 within passage 18 is established by aligning the entrance 28 of passage 40 with passage 26, which carries recirculating fluid flow to the nozzle.

In accordance with the provisions of the patent statutes, the preferred embodiment has been described. However, it should be noted that the alternate embodiments can be practiced otherwise than as specifically illustrated and described.

The invention claimed is:

1. An assembly, comprising:
a transmission pump having an inlet;
a sump;
a jet pump having a nozzle including an axial passage for carrying fluid from the sump toward the inlet, and a second passage bounded by a wall between the axial passage and the second passage and extending into the axial passage,
the second passage including an entrance facing a nozzle lateral side and connected to the recirculation passage and an exit, partially surrounded by the axial passage, communicating with the inlet,
wherein the wall is arcuate along a direction of flow from the entrance to the exit to change the direction of the flow from perpendicular to the axial passage flow at the entrance to parallel to the axial passage flow at the exit, and the wall tapering inward to narrow the second passage from the entrance to the exit.

2. The assembly of claim 1, wherein:
the transmission pump includes a pump body;
a stop surface formed on the pump body; and
the nozzle further includes a flange that contacts the stop, thereby establishing an elevation location for the exit relative to the pump body.

* * * * *